No. 745,975. PATENTED DEC. 1, 1903.
F. L. SWEANY.
LINK FOR SPROCKET CHAINS.
APPLICATION FILED SEPT. 17, 1903.
NO MODEL.
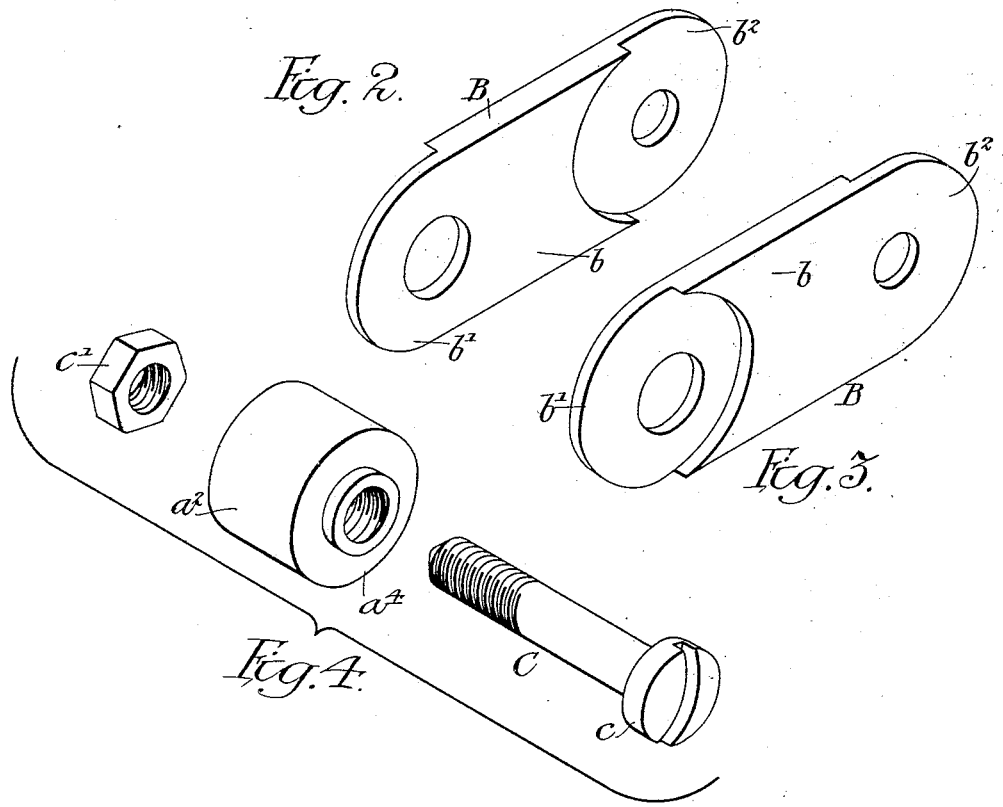
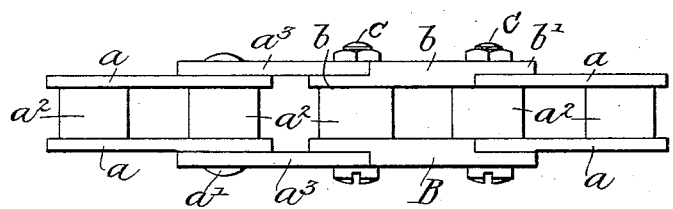
Witnesses:-
Inventor:-
Francis Leverett Sweany,
by his Attorneys;

No. 745,975.

Patented December 1, 1903.

UNITED STATES PATENT OFFICE.

FRANCIS LEVERETT SWEANY, OF PHILADELPHIA, PENNSYLVANIA.

LINK FOR SPROCKET-CHAINS.

SPECIFICATION forming part of Letters Patent No. 745,975, dated December 1, 1903.

Application filed September 17, 1903. Serial No. 173,619. (No model.)

*To all whom it may concern:*

Be it known that I, FRANCIS LEVERETT SWEANY, a citizen of the United States, residing in Philadelphia, Pennsylvania, have invented certain Improvements in Links for Sprocket-Chains, of which the following is a specification.

My invention relates to certain improvements in links for sprocket-chains, its object being to provide a link of such construction that a single unit thereof may be available to replace two successive links in a sprocket-chain of the ordinary form, or if such unit be removed from a chain it shall be possible to directly couple the links on the adjacent ends of said chain. These objects I secure as hereinafter set forth, reference being had to the accompanying drawings, in which—

Figure 1 is a plan view of a portion of a sprocket-chain, showing my improved link as applied thereto. Figs. 2 and 3 are perspective views of the two side members of my improved link; and Fig. 4 is a detached perspective view of the bolt, cylindrical bearing-piece, and nut employed with my improved link.

In sprocket-chains of the ordinary construction two plates forming side members, as $a$ in Fig. 1, are connected at their ends by a rivet $a'$ and hold between them two cylindrical pieces or rollers $a^2$. Such a combination forms one link, and the next link in the chain is composed of two other plates $a^3$, held to the outside faces of the plates $a$ by said rivet $a'$, which is common to the two links. A third link (not shown) would have the plates forming its side members bolted or riveted to the ends and inside faces of the plates or side members $a^3$. If now it be desired, as is frequently found necessary, particularly in automobile practice, to shorten a chain of this nature, it is imperative, in order that it shall be possible to operatively connect the ends of said chain, that at least two links be removed from it, for if but a single pair of side members, as $a^3$, or one link be taken out there is no practical way of uniting the two adjacent pairs of links, both of which have side members which lie in coincident planes.

By my invention I provide what may be described as a "master-link," designed to practically replace the two links composed of side members $a$ and $a^3$, so that it will be possible to shorten a chain by a length equal to that of but one instead of two links. In carrying out this idea I provide a master-link having two side members of the form shown in Figs. 2 and 3, and these may be described as consisting of a body portion $b$, whose thickness is preferably equal to the sum of the thicknesses of the two plates or side members $a$ and $a^3$ and which is provided with offset end portions $b'$ and $b^2$. It will be seen that these end portions are practically the continuations of the body portion of the link and are recessed or cut away to a depth equal to the thickness of one of the links of the chain. It will be noted, however, that said master-link has its ends recessed, as shown, on opposite faces, so that in use one of the side members or links, as $a^3$, fits into the recessed portion of the end $b'$ while remaining in the same position as if it were bolted to one of the side members $a$. The recessed portion of the end $b^2$ of the master-link receives the side member $a$ of the link adjacent to it in a manner similar to that in which junction would have been made to one of the side members $a^3$.

As is customary in sprocket-chains of the character described, a cylindrical portion or roller $a^2$ is provided, having at its ends projecting collars $a^4$, and the master-link B, as well as the side members $a$, are provided with holes at their ends for the reception of said collars, one end of such link having a smaller hole for the reception of the bolt C.

The bolts in the body of the chain usually have their heads riveted over, as shown at $a'$, but the bolts C for the master-link are provided with a slotted head $c$ and screw-threads on the opposite end for the reception of the nut $c'$. If desired, any suitable form of pin may be employed in place of the bolt C with its nut, such pin being held in place by a cotter in the well-known manner.

It will thus be seen that by my invention I provide a master-link for use with a chain whose links are composed of plates alternately lying in parallel planes, said master-link having one end recessed to receive a plate lying in one plane and its other end recessed for the reception of a plate in a second parallel plane.

I claim as my invention—

1. The combination with a sprocket-chain including links whose alternate members lie in parallel planes, of a master-link having one end formed for the reception of a link lying in one of said planes and its other end formed to receive a link lying in the other plane, substantially as described.

2. The combination of a sprocket-chain including members composed of two pairs of links, one pair lying outside of the other, with a master-link composed of two side members, of which each one has one end recessed for the reception of one of the inner set of links and its other end recessed for the reception of one of the outer set of links, substantially as described.

3. The combination with a sprocket-chain having links whose alternate members lie in parallel planes, of a master-link having one end recessed on one face and the other end recessed on the opposite face for the reception of the members of links lying respectively in said parallel planes, substantially as described.

4. The combination with a sprocket-chain having links whose alternate members lie in parallel planes, of a master-link having members one end of each of which is formed for the reception of the links lying in one plane and whose other end is formed for the reception of the links lying in another plane, said links and the master-link having openings in their ends, with cylindrical pieces at the points of junction of the links and bolts for holding together said cylindrical pieces and the adjacent links, substantially as described.

5. The combination of a sprocket-chain having flat plates forming links, one set of said plates lying outside of the outer set, with a master-link having a body portion substantially equal in thickness to the sum of the thicknesses of said two plates, said master-link having its ends recessed on opposite faces to a depth substantially equal to the thickness of one of said plates, substantially as described.

6. The combination with a sprocket-chain having links whose alternate members lie in parallel planes, of a master-link each of whose members has a body portion of a thickness equal to the sum of the thicknesses of two links of the chain, there being a recess at each end of said master-link for the reception of the alternate members of the chain, substantially as described.

7. The combination with a sprocket-chain having links whose alternate members lie in parallel planes, bars for connecting said members, rollers on the bars engaging certain of the link members so as to be supported independently of the bars, of a master-link having members of which each has one end recessed for the reception of the chain members lying in one plane and its other end recessed to receive the chain members lying in a second plane, said master-link having its members made to also support a roller independently of the bars, substantially as described.

8. The combination with a sprocket-chain having links whose alternate members lie in parallel planes, bars for connecting said members, rollers on said bars having collars entering certain of the members so as to be supported independently of the bars, with a master-link having members of which each has one end recessed for the reception of the chain members lying in one plane and the other end recessed to receive the chain members lying in a second plane, the members of said master-link having one end provided with an opening for the reception of a collar on a roller, substantially as described.

In testimony whereof I have signed my name to this specification in the presence of two subscribing witnesses.

FRANCIS LEVERETT SWEANY.

Witnesses:
    Jos. H. Klein,
    William E. Bradley.